US010643796B2

(12) United States Patent
Chacko et al.

(10) Patent No.: US 10,643,796 B2
(45) Date of Patent: May 5, 2020

(54) CONDUCTIVE POLYMER DISPERSION WITH ENHANCED COVERAGE

(71) Applicant: KEMET Electronics Corporation, Simpsonville, SC (US)

(72) Inventors: Antony P. Chacko, Simpsonville, SC (US); Philip M. Lessner, Simpsonville, SC (US); John Joseph Ols, Simpsonville, SC (US); Yaru Shi, Simpsonville, SC (US); Qingping Chen, Simpsonville, SC (US)

(73) Assignee: KEMET Electronics Corporation, Fort Lauderdale, FL (US)

(*) Notice: Subject to any disclaimer, the term of this patent is extended or adjusted under 35 U.S.C. 154(b) by 72 days.

(21) Appl. No.: 15/379,729

(22) Filed: Dec. 15, 2016

(65) Prior Publication Data

US 2017/0098512 A1  Apr. 6, 2017

Related U.S. Application Data

(63) Continuation-in-part of application No. 14/743,195, filed on Jun. 18, 2015, now Pat. No. 9,941,055, which
(Continued)

(51) Int. Cl.
*H01G 9/045*  (2006.01)
*H01G 9/00*  (2006.01)
(Continued)

(52) U.S. Cl.
CPC .......... *H01G 9/045* (2013.01); *H01G 9/0036* (2013.01); *H01G 9/012* (2013.01); *H01G 9/028* (2013.01);
(Continued)

(58) Field of Classification Search
CPC ...... H01G 9/045; H01G 9/0036; H01G 9/012; H01G 9/028; H01G 9/0425; H01G 9/08; H01G 9/15; Y10T 29/43
(Continued)

(56) References Cited

U.S. PATENT DOCUMENTS 5,812,367 A * 9/1998 Kudoh ................. H01G 9/0036
29/25.03
6,466,421 B1 * 10/2002 Monden ................ H01G 9/012
361/115
(Continued)

FOREIGN PATENT DOCUMENTS

CN 102768903 11/2012
EP 1798785 6/2007
WO WO 2012/119711 9/2012

*Primary Examiner* — Brian K Talbot
(74) *Attorney, Agent, or Firm* — Joseph T. Guy; Patent Filing Specialist, Inc.

(57) ABSTRACT

An improved process for forming an electrolytic capacitor is provided. The process comprises: providing an anode with an anode wire extending from the anode body; forming a dielectric on the anode to form an anodized anode; applying a first slurry wherein the first slurry comprises conducting polymer and polyanion, wherein the polyanion and conducting polymer are in a first weight ratio thereby forming a first slurry layer; and applying a second slurry on the first slurry layer wherein the second slurry comprises the conducting polymer and said polyanion and wherein the polyanion and the conducting polymer are in a second weight ratio wherein the second weight ratio is lower than the first weight ratio.

43 Claims, 5 Drawing Sheets

Related U.S. Application Data is a continuation-in-part of application No. 13/777,769, filed on Feb. 26, 2013, now Pat. No. 9,312,074.

(60) Provisional application No. 61/603,635, filed on Feb. 27, 2012, provisional application No. 62/267,707, filed on Dec. 15, 2015.

(51) Int. Cl.
  *H01G 9/15* (2006.01)
  *H01G 9/08* (2006.01)
  *H01G 9/028* (2006.01)
  *H01G 9/042* (2006.01)
  *H01G 9/012* (2006.01)

(52) U.S. Cl.
  CPC ............ *H01G 9/0425* (2013.01); *H01G 9/08* (2013.01); *H01G 9/15* (2013.01); *Y10T 29/43* (2015.01)

(58) Field of Classification Search
  USPC ...................................... 427/79–81
  See application file for complete search history.

(56) References Cited

U.S. PATENT DOCUMENTS

| | | | |
|---|---|---|---|
| D586,767 S | 2/2009 | Guerrero et al. | |
| D599,309 S | 9/2009 | Guerrero et al. | |
| 7,658,986 B2 | 2/2010 | Poltorak et al. | |
| D616,388 S | 5/2010 | Guerrero et al. | |
| 8,313,538 B2 | 11/2012 | Merker et al. | |
| 8,771,381 B2 | 7/2014 | Chen et al. | |
| 8,808,403 B2* | 8/2014 | Qiu | H01G 9/0029 205/198 |
| 8,882,856 B2 | 11/2014 | Intelmann et al. | |
| 9,030,807 B2 | 5/2015 | Chacko et al. | |
| 2004/0074779 A1* | 4/2004 | Sotzing | C08G 61/126 205/414 |
| 2006/0076541 A1* | 4/2006 | Yoshida | C08L 65/00 252/500 |
| 2006/0226396 A1* | 10/2006 | Majumdar | C08K 5/0091 252/500 |
| 2008/0005878 A1* | 1/2008 | Merker | H01G 9/0032 29/25.03 |
| 2009/0303665 A1* | 12/2009 | Oohata | H01G 9/028 361/527 |
| 2010/0302709 A1* | 12/2010 | Dreissig | H01G 9/035 361/505 |
| 2011/0080691 A1* | 4/2011 | Ning | C08L 65/00 361/525 |
| 2012/0057275 A1* | 3/2012 | Intelmann | H01G 9/028 361/523 |
| 2012/0127634 A1* | 5/2012 | Sugihara | H01G 9/0036 361/525 |
| 2013/0059064 A1 | 3/2013 | Majima et al. | |
| 2014/0022704 A1 | 1/2014 | Petrzilek et al. | |
| 2014/0160632 A1 | 6/2014 | Chacko et al. | |
| 2014/0211372 A1* | 7/2014 | Sugawara | H01G 9/028 361/525 |
| 2015/0279503 A1* | 10/2015 | Scheel | H01G 11/48 361/529 |
| 2016/0005545 A1* | 1/2016 | Burke | H01G 9/0003 361/529 |

* cited by examiner

CONDUCTIVE POLYMER DISPERSION WITH ENHANCED COVERAGE

CROSS-REFERENCE TO RELATED APPLICATIONS

The present application claims priority to U.S. Pat. Appl. No. 62/267,707 filed Dec. 15, 2015. The present invention is a continuation-in-part application of U.S. Pat. No. 14,743,195 filed Jun. 18, 2015, now U.S. Pat. No. 9,941,055 issued Apr. 10, 2018, which is, in turn, a continuation-in-part application of U.S. patent application Ser. No. 13/777,769 filed Feb. 26, 2013 now U.S. Pat. No. 9,312,074 issued Apr. 12, 2016, which in turn, claims priority to U.S. Provisional Patent Appl. No. 61/603,635 filed Feb. 26, 2012 all of which are incorporated herein by reference.

BACKGROUND

The present invention is related to an improved method of forming a solid electrolytic capacitor and an improved capacitor formed thereby. More specifically, the present invention is related to materials and methods for improving corner and edge coverage of solid electrolytic capacitors. The invention also discloses methods for manufacturing the same.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as polyaniline, polypyrrole, polythiophene and their derivatives. Solid electrolytic capacitors with intrinsically conductive polymers as the cathode material have been widely used in the electronics industry due to their advantageously low equivalent series resistance (ESR) and "non-burning/non-ignition" failure mode. In the case of conductive polymer cathodes the conductive polymer is typically applied by either chemical oxidation polymerization, electrochemical oxidation polymerization or spray techniques with other less desirable techniques being reported.

The backbone of a conductive polymer comprises a conjugated bonding structure. The polymer can exist in two general states, an undoped, non-conductive state, and a doped, conductive state. In the doped state, the polymer is conductive but of poor processibility due to a high degree of conjugation along the polymer chain. In its undoped form, the same polymer loses its conductivity but can be processed more easily because it is more soluble. When doped, the polymer incorporates anionic moieties as constituents on its positively charged backbone. In order to achieve high conductivity, the conductive polymers used in the capacitor must be in doped form after the completion of the process although, during the process the polymer can be undoped/doped to achieve certain process advantages.

Various types of conductive polymers including polypyrrole, polyaniline, and polythiophene are applied to the capacitors. The major drawback of conductive polymer capacitors, regardless of the types of conductive polymers employed, is their relatively low working voltage compared to their $MnO_2$ counterparts. The polymer capacitors have reliability issues, to varying degrees, when the voltage rating exceeds 25V. This is believed to be caused by the relatively poor dielectric-polymer interface, which has poor "self-healing" capability. The ability to withstand high voltage can be best characterized by the breakdown voltage (BDV) of the capacitors. Higher BDV corresponds with better reliability. For reasons which were previously unknown, the break down voltage of capacitors comprising conductive polymers has been limited to about 55V thereby leading to a capacitor which can only be rated for use at about 25V. This limitation has thwarted efforts to use conductive polymers more extensively.

U.S. Pat. No. 7,563,290, which is incorporated herein by reference, describes the polymer slurry process wherein a conducting polymer dispersion is deposited such as by dipping. The resulting capacitors show excellent high voltage performances, reduced DC leakage (DCL) and improved long term reliability.

It is highly desirable that the capacitor devices are of high reliability and that they can withstand stressful environments. Therefore, the integrity of the anodes and the robustness of conductive polymer cathodes are essential for high quality capacitor products. However, it is a challenge to form a conductive polymer coating on the anodes that is defect-free, and which is capable of withstanding thermal mechanical stress during anode resin encapsulation and surface-mounting. The improper application of polymer slurry often leads to the formation of a poor polymer coating.

In a manufacturing process to produce conductive polymer based valve metal capacitors the valve metal powder, such as tantalum, is mechanically pressed into anodes that are subsequently sintered to form porous bodies. The anodes are anodized to a pre-determined voltage in a liquid electrolyte to form a dielectric layer onto which a cathode layer of conductive polymer is subsequently formed via an in situ polymerization process comprising multi-cycle oxidizer/monomer coatings and polymerization reactions. The anodes are then coated with graphite and Ag followed by assembling and molding into a finished device.

A particular concern is the formation of adequate polymer coatings on edges and corners. In order to achieve good quality polymer coating on anodes, especially on the corners and edges, many types of chemical compounds are used for either forming a pre-coating on the anode or which are added to the polymer slurry. U.S. Pat. No. 7,658,986, which is incorporated herein by reference, describes the difficulty in coating the edges and corners of the anode with polymer slurry. These materials tend to pull away from the corners and edges due to surface energy effects. The resulting thin coverage at corners and edges leads to poor reliability of the device.

One approach to mitigating poor coverage of the anode corners and edges has been to alter the design of the anode as disclosed in U.S. Pat. No. 7,658,986, D616,388, D599, 309, and D586,767 each of which is incorporated herein by reference. While changes in the anode design are beneficial in some regards, the effect of poor coverage is still present even with anode designs facilitating corner and edge coverage by polymer slurry as the primary cathode layer.

Another approach for improving coverage of the corners and edges is provided in U.S. Pat. No. 8,882,856, which is incorporated herein by reference, which describes a group of chemical compounds called crosslinkers, which are mostly multi-cationic salts or amines. This patent teaches the application of a solution of the crosslinker between adjacent layers of conducting polymer dispersion coating to achieve good polymer coverage on corners and edges of the anodes. The effectiveness of the crosslinker is attributed to the cross-linking ability of multi-cationic salts or amines to the slurry/dispersion particles. While crosslinkers are advantageous for improving the coating coverage on corners and edges of the anodes, the addition of these crosslinkers, which are mostly ionic in nature, has the unintended consequences of degrading the humidity performance of a finished product.

Crosslinkers, by definition, are multi-functional and link one polymer chain, or portion of a chain, to another thus tending to be part of the polymer system. While crosslinkers are advantageous in many applications, it is undesirable to have an ionic crosslinker react to the polymer chain and be part of the polymer chain. Ionic materials, especially low molecular weight ionic compounds or mobile ionic compounds, can diffuse though various cathode layers, especially under humid conditions, and can cause higher leakage current.

U.S. Pat. No. 8,771,381, which is incorporated herein by reference, teaches the use of nonionic polyol as a precoat to conducting polymer dispersion to eliminate the use of ionic compounds as well as improving the coverage U.S. Pat. No. 9,030,807, which is incorporated herein by reference, teaches a method for avoiding crosslinking of ionic compounds as well as for improving the coverage by the use of a class of latent acid curing catalysts such as amine blocked sulphonic acids and certain class of nanoparticles between the layers of conducting polymer dispersions.

The prior art mentioned above uses an insulating compound between conducting polymer dispersions to improve the coverage. Having an insulating material between conducting polymer can affect Equivalent Series Resistance (ESR) and other electrical properties. So a need exists for materials and methods which improves corner and edge coverage while not impacting the electrical properties adversely. An advancement in the use of crosslinkers for formation of a cathode layer on solid electrolytic capacitors is provided herein.

SUMMARY OF THE INVENTION

It is an object of the invention to provide an improved solid electrolytic capacitor.

It is another object of the invention to provide an improved method for preparing a solid electrolytic cathode capacitor with good corner and edge coverage.

It has now been found that, surprisingly, corner and edge coverage can be improved using a conductive polymer dispersion with differing weight ratios of polyanion and conductive polymer and particularly comprising crosslinkers in the dispersion with amine compounds, and particularly compounds with multiple amine groups, being particularly advantageous.

It has now been found that enhanced ESR performance is obtained by the use of the inventive conductive polymer dispersion instead of prior art crosslinkers, blocked amine salts or polyols.

These and other advantages, as will be realized, are provided a process for forming an electrolytic capacitor comprising: providing an anode with an anode wire extending from the anode body; forming a dielectric on the anode to form an anodized anode; applying a first slurry wherein the first slurry comprises conducting polymer and polyanion, wherein the polyanion and conducting polymer are in a first weight ratio thereby forming a first slurry layer; and applying a second slurry on the first slurry layer wherein the second slurry comprises the conducting polymer and said polyanion and wherein the polyanion and the conducting polymer are in a second weight ratio wherein the second weight ratio is lower than the first weight ratio.

Yet another embodiment is provided in A method of forming an electrolytic capacitor comprising: providing an anode with an anode lead extending therefrom; forming a dielectric on the anode; forming a first dispersion layer from a first dispersion on the first conductive polymer layer wherein the first dispersion comprises a conducting polymer and a polyanion with a first weight ratio of polyanion to conducting polymer of no more than 6; and forming a second dispersion layer on the first dispersion layer from a second dispersion wherein the second dispersion comprises the conducting polymer and the polyanion in a second weight ratio of the polyanion to the conducting polymer and the second weight ratio is lower than the first weight ratio and the second weight ratio is no more than 3.

Yet another embodiment is provided in a method of forming an electrolytic capacitor comprising: providing an anode with an anode lead extending therefrom; forming a dielectric on the anode; forming a first conductive polymer layer on the dielectric; forming a first dispersion layer from a first dispersion on the first conductive polymer layer wherein the first dispersion comprises a conducting polymer and a polyanion with a first weight ratio of polyanion to conducting polymer of no more than 6; and forming a second dispersion layer on said first dispersion layer from a second dispersion wherein said second dispersion comprises the conducting polymer, said polyanion and a crosslinker and said second dispersion has a second weight ratio of polyanion to conducting polymer and the second weight ratio is lower than the first weight ratio and the second weight ratio is no more than 3.

Yet another embodiment is provided in a process for forming an electrolytic capacitor comprising: providing an anode with an anode wire extending from the anode body; forming a dielectric on the anode to form an anodized anode; forming a layer of conductive polymer on the dielectric; applying a first slurry on the layer of conductive polymer wherein the first slurry comprises conducting polymer and polyanion, wherein the polyanion and conducting polymer are in a first weight ratio thereby forming a first slurry layer; and applying a second slurry on the first slurry layer wherein the second slurry comprises the conducting polymer and the polyanion and wherein the polyanion and the conducting polymer are in a second weight ratio.

FIGURES

DESCRIPTION

The instant invention is specific to a method of making a solid electrolytic capacitor and a solid electrolytic capacitor made thereby. More specifically, the instant invention is specific to a solid electrolytic capacitor with improved ESR achieved by the use of slurries comprising different weight ratios of conductive polymer and polyanion and preferably comprising a crosslinker, preferably an amine, added to at least one of the slurries.

The invention will be described with reference to the various figures which form an integral non-limiting component of the disclosure. Throughout the disclosure similar elements will be numbered accordingly.

Figure 7:
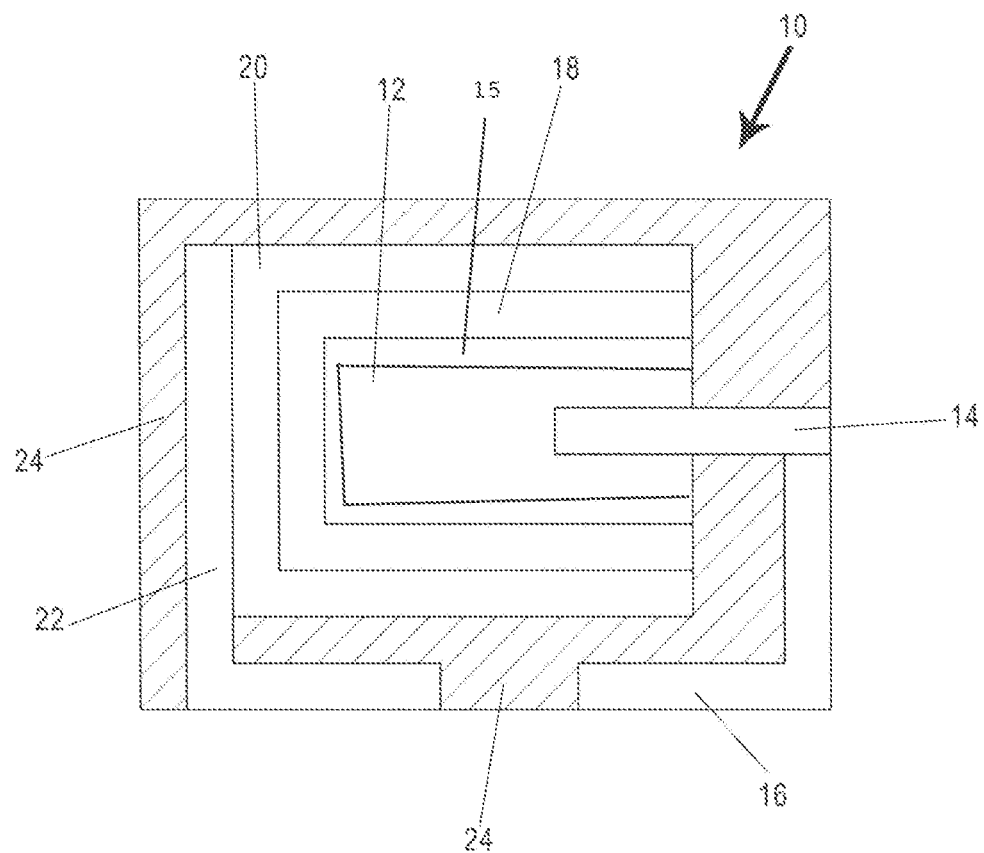
FIG. 7 is a schematic cross-sectional view of an embodiment of the invention.

An embodiment of the invention is illustrated in cross-sectional schematic side view in FIG. 7. In FIG. 7, a capacitor, generally represented at 10, comprises an anodize anode, 12, with an anode lead wire, 14, extending therefrom or attached thereto. The anode lead wire is preferably in electrical contact with an anode lead, 16. A first conductive layer, 15, as a cathode layer is formed on the anodized anode and preferably the first conductive layer encases a portion of the anodized anode and is preferably a layer formed by in-situ polymerization. A first slurry layer, 18, and second slurry layer, 20, as a cathode layer are formed sequentially on the first conductive layer and encase a portion of the first conductive layer with the proviso that the cathode and anode are not in direct electrical contact. A cathode lead, 22, is in electrical contact with the cathode layers. It is well understood that soldering a lead frame, or external termination, to a polymeric cathode is difficult. It has therefore become standard in the art to provide conductive interlayers which allow solder adhesion. In many embodiments it is preferred to encase the capacitor in a non-conductive resin, 24, with at least a portion of the anode lead and cathode lead exposed for attachment to a circuit board as would be readily understood by one of skill in the art. The cathode comprises multiple interlayers which may be cross-linked to each other as will be more fully described herein.

The first conductive layer comprises a conductive polymer preferably formed by in-situ polymerization without limit thereto. An in-situ formed conductive polymer is hypothesized to more effectively enter the interstitial portions of the porous anodized anode thereby forming an improved capacitor. Subsequent layers are preferably formed by dipping into a slurry comprising pre-polymerized conductive polymer with additional additives as will be more specifically set forth herein.

The first slurry layer is formed by applying a first slurry, preferably by dipping, wherein the first slurry comprises a polyanion and a conductive polymer in a first weight ratio of polyanion to conductive polymer wherein the first weight ratio is no more than 6 and preferably no more than 4. While not limited to theory, it is hypothesized that the polyanion rich first slurry provides enhanced coating and therefore improves ESR of the final capacitor. More preferably the first weight ratio is no more than 3.4 with about 3.0 to 3.4 being suitable for demonstration of the invention.

The second slurry layer is formed by applying a second slurry, preferably by dipping, wherein the second slurry comprises a polyanion and conductive polymer in a second weight ratio of polyanion to conductive polymer wherein the second weight ratio is no more than 3, preferably no more than 2, and more preferably no more than 1, with the proviso that the second weight ratio is less than the first weight ratio, preferably by at least 5%, preferably at least 6% and more preferably at least 8%.

Figure 8:
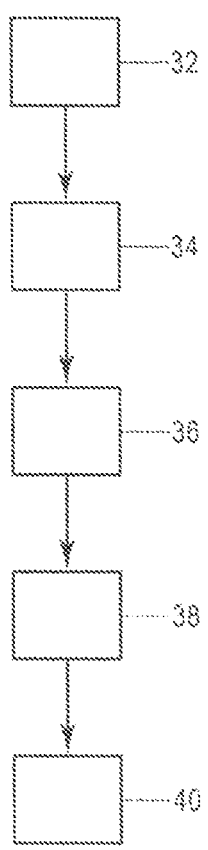
FIG. 8 is a flow chart representation of an embodiment of the invention.

An embodiment of the invention is illustrated in flow chart form in FIG. 8. In FIG. 8, the method of forming a solid electrolytic capacitor of the instant invention is illustrated. In FIG. 8, an anodized anode is provided at 32. A first conductive polymer layer is formed at 34 wherein the first conductive polymer comprises a conductive polymer preferably formed by in-situ polymerization. A first slurry layer is formed on the first conductive layer at 36, preferably by dipping into a first slurry, wherein the first slurry comprises polyanion and conductive polymer in a first weight ratio as set forth above. After the first slurry layer is formed, and preferably cured, a second slurry layer is formed on the first slurry layer wherein the second slurry layer comprises polyanion and conductive polymer in a second weight ratio as set forth above. The second slurry layer also preferably includes a crosslinker and particularly an amine crosslinker. The application of additional conductive polymer layers may be used if desired. It is preferable to apply at least one carbon containing layer and at least one metal containing layer on the final conductive carbon layer after which anode and cathode leads are attached to the anode and cathode respectively and the capacitor is optionally, but preferably, encased at 40 and tested.

Cross-linking comprises the use of a material comprising at least two cross-linkable functionalities wherein one cross-linkable functionality forms a first bond and the second cross-linkable functionality forms a second bond thereby forming a bridge of cross-linking molecule between two portions of polymer. The cross-linkable functionality may form a covalent bond or an ionic bond. The invention thus provides a process for improved ESR stability by providing a molecule, oligomer, or polymer with crosslinkable functionality in a layer and across layers thereby improving the layer integrity and the surface coverage. Once exposed to curing conditions, which is typically thermal curing, the crosslinkable molecules react thus forming a strongly bound interpenetrating network of covalent and ionic bonds.

The crosslinkable materials preferably comprise two components with one component preferably being a compound, oligomer or polymer with multifunctional or multiple reactive groups. The second component is preferably a molecule with crosslinkable functionality preferably selected from the group consisting of carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or quaternary ammonium salts.

In one embodiment the invention includes a solid electrolytic capacitor comprising a crosslinkable material system wherein an oligomer or polymer comprises multifunctional reactive groups selected from the group consisting of polyester, polyurethane, polyamide, polyamine, polyimide, silicone polyester, hydroxyl functional silicone, hydroxyethyl cellulose, polyvinyl alcohol, phenolic, epoxy, butyral, copolymers of these or mixture of these multifunctional polymers such as epoxy/amine, epoxy/anhydride, isocyanate/amine, isocyanate/alcohol, unsaturated polyesters, vinyl esters, unsaturated polyester and vinyl ester blends, unsaturated polyester/urethane hybrid resins, polyurethane-ureas, reactive dicyclopentadiene resins or reactive polyamides. The oligomer or polymer with multifunctional or multiple reactive groups preferably includes at least one carboxylic acid group and at least one hydroxyl function group. A particularly preferred oligomer or polymer with multifunctional reactive groups is a polyester containing carboxylic and hydroxyl functionality. In addition to oligomers or polymers, particles with surface functional groups can also take part in the crosslinking. Particles with functional groups are preferred wherein the functional groups are selected from carboxylic, hydroxyl, amine, epoxy, anhydride, isocyanate, imide, amide, carboxyl, carboxylic anhydride, silane, oxazoline, (meth)acrylates, vinyls, maleates, maleimides, itaconates, allyl alcohol esters, dicyclo-pentadiene-based unsaturations, unsaturated $C_{12}$-$C_{22}$ fatty esters or amides, carboxylic acid salts or quaternary ammonium salts. Particles can be nanoparticles or microparticles. One example of functionalized nanoparticles is organomodified nanoclay.

Crosslinkers comprising at least amine groups and, in one embodiment, preferably at least 2 amine groups. Diamines which are particularly suitable amines are listed in U.S. Pat. No. 8,882,856, which is incorporated herein by reference. Specifically preferred amines include crosslinkers which comprise at least one diamine, triamine, oligoamine or polymeric amine or derivatives thereof including the following amines: aliphatic amines, particularly aliphatic α, Ω-diamines such as 1,4-diaminocyclohexane or 1,4-bis(amino-methyl)cyclohexane; linear aliphatic α, Ω-diamines such as ethylenediamine, 1,6-hexanediamine, 1,7-heptanediamine, 1,8-octanediamine, 1,9-nonanediamine, 1,10-decanediamine or 1,12-dodecanediamine; derivatives of aliphatic α, Ω-diamines such as N,N-dimethylethylenediamine, N,N,N',N'-tetramethylethylenediamine, N,N,N',N'-tetramethyl-1,4-butanediamine, N,N,N,N',N',N'-hexamethylhexamethylenediammonium dibromide, piperazine, 1,4-diazabicyclo[2.2.2]octane, N,N,N',N'-tetrakis(2-hydroxypropyl) ethylenediamine, N-[3-(trimethoxysilyl)propyl] ethylenediamine, or 1,4-bis(3-aminopropyl)piperazine; amides such as N,N'-diacetyl-1,6-hexanediamine, N,N,N',N'-tetraacetylethylene-diamine, 1,4-diformylpiperazines or N,N'-ethylenebis(stearamide); aliphatic amines having at least three amino groups such as 1,4-bis(3-aminopropyl) piperazine; linear aliphatic amines having at least three amino groups such as N-(6-aminohexyl)-1,6-diaminohexane or N-(3-aminopropyl)-1,4-diaminobutane; derivatives of linear aliphatic amines having at least three amino groups such as 3-[2-(2-aminoethylamino) ethylamino]propyltrimethoxysilane; aromatic amines having at least two amino groups such as brilliant green (Formula I)

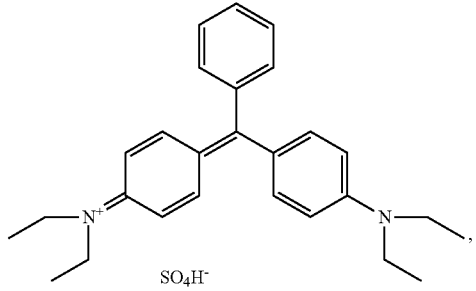

Formula I 4,4'-methylenebis(N,N-diglycidylaniline), o-phenylenediamine, m-phenylenediamine, p-phenylenediamine, 1,5-diaminonaphthalene, 1,8-diaminonaphthalene, 2,3-diaminonaphthalene, 3-aminophenyl sulfone, 4-aminophenyl sulfone, 4-aminophenyl ether, 3,3'-diaminobenzidine, 2-(4-aminophenyl)ethylamine, 4,4'-methylenedianiline, 2,6-diaminotoluene, N,N,N',N'-tetramethyl-p-phenylenediamine, 4,4'-bis(diethylamino)benzophenone, 4,4'-bis(dimethyl-amino) benzhydrol, 3,3',5,5'-tetramethylbenzidine, Auramine O, Rubine S, m-xylenediamine, phthalein, complexone, Brilliant Blue G or folic acid; aromatic triamines such as 4,4',4''-methylidinetris(N,N-dimethylaniline) (Formula II)

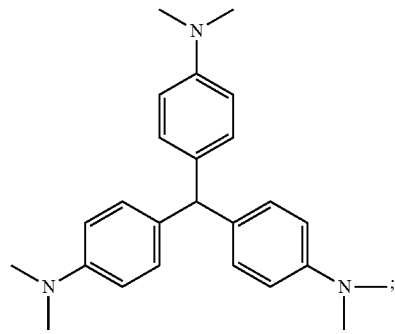

Formula II amino acids having at least two amino groups such as citrulline, arginine, glutamine, lysine, asparagine, histidine or tryptophan; polymeric amines such as poly(propylene glycol) bis(2-aminopropyl) ether, polyethyleneimine or poly(allylamine); and derivatives of polymeric amines such as ethoxylated polyethyleneimine. Further examples are given in Formulae III-VI.

Formula III

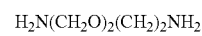

Formula IV

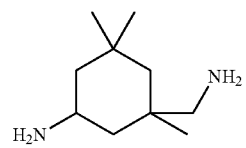

Formula V

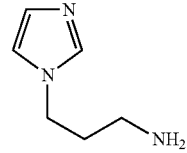

Formula VI

Mixtures of the crosslinkers may be used.

Preference is given to aliphatic amines, with particular preference for aliphatic α, Ω-diamines, and even more preferably linear aliphatic α, Ω-diamines. Particularly preferred are diaminooctane, diaminononane, diaminodecane, diaminoundecane and derivatives thereof, and mixtures of diaminooctane, diaminononane, diaminodecane, diaminoundecane and derivatives thereof. Diaminodecane is particularly suitable for demonstration of the invention.

Particularly preferred monoamines include monoamines listed in U.S. Publ. Appl. No. 20160293339. Particularly preferred are selected from the group consisting of: ammonia, ethylamine, diethylamine, triethylamine, propylamine, dipropylamine, tripropylamine, isopropylamine, diisopropylamine, butylamine, tripropylamine, dibutylamine, tributylamine, isobutylamine, diisobutylamine, triisobutylamine, methylethylamine, pentylamine, hexylamine, octylamine, decylamine, allylamine, ethanolamine, diethanolamine, triethanolamine, methylethanolamine, butylethanolamine, cyclohexylethanolamine, cyclohexyldiethanolamine, N-ethylethanolamine, N-propylethanol amine, tris(hydroxymethyl)aminomethane, 3-amino-1-propanol, amino-2-propanol, diisopropanolamine, triisopropanolamine, 5-amino-1-pentanol, 6-amino-1-hexanol, pyridine, aniline, methyl-aniline, nitro-aniline, 1-naphthylamine, 2-naphthylamine, and glucosamine.

The polyanions are preferably polymeric carboxylic acids or polymeric sulfonic acids without limit thereto. Particularly preferred polyanions are listed in U.S. Pat. No. 8,882,856. Toluene sulfonic acid or polystyrene sulfonic acid is particularly suitable for demonstration of the invention.

Polyester comprising carboxylic acid with an acid number of from about 3 to 200 (mg KOH/g resin solids) is a particularly preferred oligomer or polymer with multifunctional reactive groups. More preferable is polyester comprising carboxylic acid with an acid number of from about 3 to 100 (mg KOH/g resin solids) and even more preferably about 20 to 50 or about 50 to 100 (mg KOH/g resin solids)

Polyester comprising carboxylic acid with a hydroxy number of from about 3 to 200 (mg KOH/g resin solids) is a particularly preferred oligomer or polymer with multifunctional reactive groups and even more preferred is a polyester comprising carboxylic acid with a hydroxy number of from about 50 to 100 (mg KOH/g resin solids).

In one embodiment the invention includes a solid electrolytic capacitor comprising polyester where the hydroxy number of the polyester is from about 3 to 100 (mg KOH/g resin solids).

Particularly preferred molecules with crosslinkable functionality includes compounds and polymers comprising melamines, isocyanates, epoxies, hexamethoxymelamines, glyoxals, furfural aldehydes and melamine formaldehyde condensates. The compounds and polymers may further comprise additional crosslinkable functionality. A particularly preferred crosslinker is hexakis (methoyxymethyl) melamine.

In a preferred embodiment at least one interlayer further comprises organic or inorganic particles or fibers with reactive functional groups or carbon particle filled polymer, a metal particle filled polymer and a conductive particle filled polymer or particles of fibers with reactive functional groups or crosslinkable groups.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. An anode consisting essentially of Ta is most preferred. Conductive polymeric materials may be employed as an anode material. Particularly preferred conductive polymers include polypyrrole, polyaniline and polythiophene.

The cathode is a conductor preferably comprising at least one of manganese dioxide and a conductive polymeric material. Particularly preferred conductive polymers include intrinsically conductive polymers most preferably selected from polypyrrole, polyaniline and polythiophene. Metals can be employed as a cathode material with valve metals being less preferred. The cathode may include multiple interlayers wherein adhesion layers are employed to improved adhesion between the conductor and the termination. Particularly preferred adhesion interlayers include carbon, silver, copper, or another conductive material in a binder.

The dielectric is a non-conductive layer which is not particularly limited herein. The dielectric may be a metal oxide or a ceramic material. A particularly preferred dielectric is the oxide of a metal anode due to the simplicity of formation and ease of use.

The anode lead wire is chosen to have low resistivity and to be compatible with the anode material. The anode lead wire may be the same as the anode material or a conductive oxide thereof. Particularly preferred anode lead wires include Ta, Nb and NbO. The shape of the anode lead wire is not particularly limiting. Preferred shapes include round, oval, rectangular and combinations thereof. The shape of the anode lead wire is chosen for optimum electrical properties of the ultimate capacitor.

The dielectric is preferably formed by dipping the anode into an anodizing solution with electrochemical conversion. Alternatively, a dielectric precursor can be applied by spraying or printing followed by sintering to form the layer. When the dielectric is an oxide of the anode material dipping is a preferred method whereas when the dielectric is a different material, such as a ceramic, a spraying or coating technique is preferred.

The cathode is preferably formed by dipping, coating or spraying either a conductor or a conductive precursor. Conductive precursors are materials which form a conductor after heating or activation.

The reaction of the crosslinkable functionality and the crosslinker occurs at elevated temperature which occurs during the normal processing steps of capacitor manufacture.

Throughout the description the terms slurry and dispersion are used interchangeably.

EXAMPLES

Comparative Example 1

Figure 1:
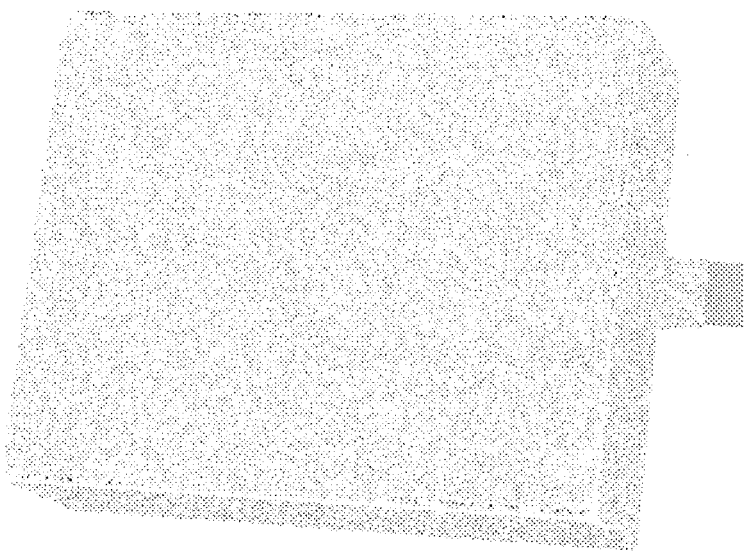
FIGS. 1-6 are representations of SEM photographs of comparative and inventive examples.
Figure 2:
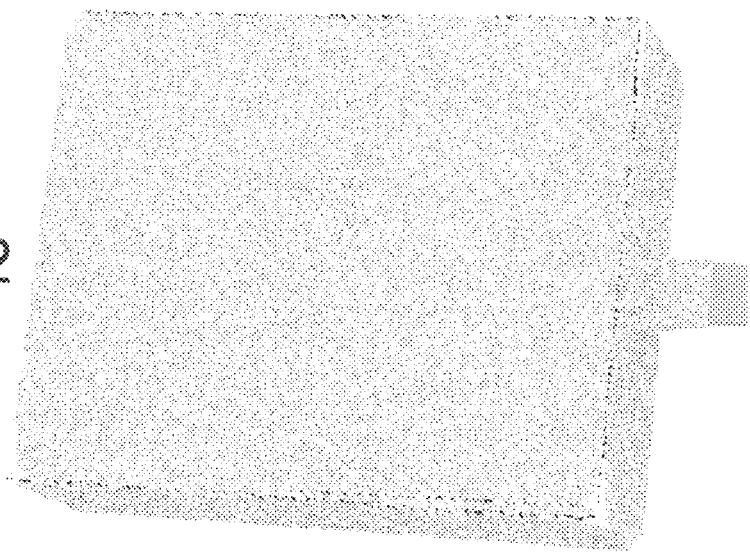

A series of D case 33 µF, 35V tantalum anodes was prepared. A thin coating of polyethylenedioxythiophene polymer (PEDOT) was applied on the dielectric of the anodes via an in-situ chemical polymerization process to achieve full capacitance. The anodes were then coated with conductive polymer dispersion. The conductive polymer dispersion coating was repeated 4 more times. The cured parts were analyzed by an Scanning Electron Microscope (SEM) for polymer coverage and a percentage coverage was obtained. Representations of the SEM micrographs are provided in FIGS. 1 and 2. Graphite and Ag coatings were applied and the samples electrical properties were analyzed. The coverage and electrical properties are recorded in Table 1.

Comparative Example 2

Figure 3:
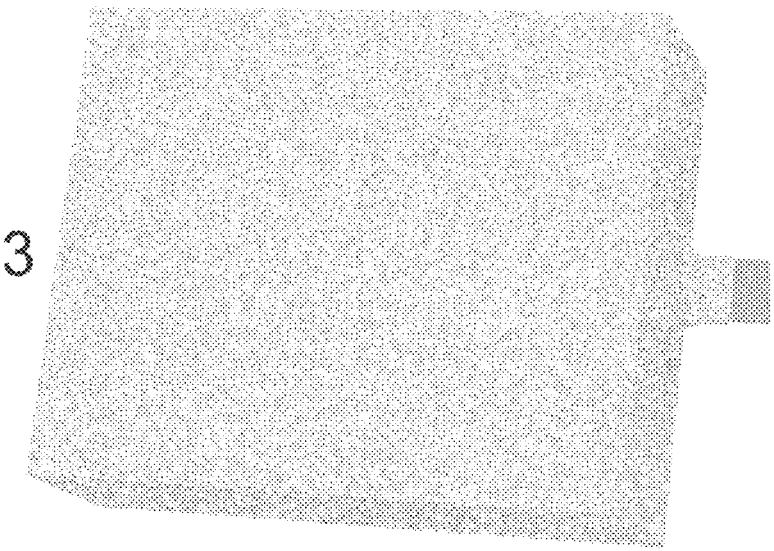
Figure 4:
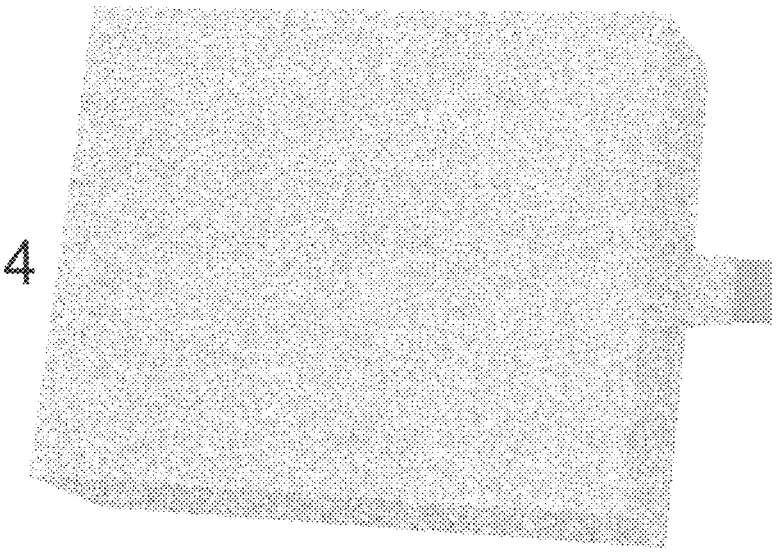

A series of D case 33 µF, 35V tantalum anodes were prepared. A thin coating of conductive polymer (PEDOT) was applied onto the anodes via an in-situ chemical polymerization process. The anodes were first coated with conductive polymer dispersion. After drying, alternating layers of a commercial crosslinker (Clevios K primer) and the conductive polymer dispersion were applied and repeated 3 more times followed by curing. The cured parts were analyzed by SEM for polymer coverage and a percentage coverage was obtained. Representations of the SEM images are provided in FIGS. 3 and 4. Graphite and Ag coatings were applied and the samples electrical properties were analyzed. The coverage and electrical properties are recorded in Table 1.

Inventive Example 1

Figure 5:
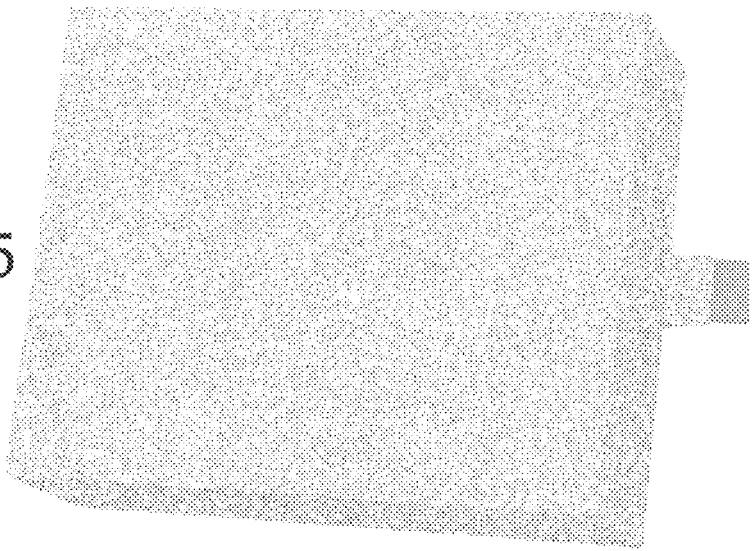
Figure 6:
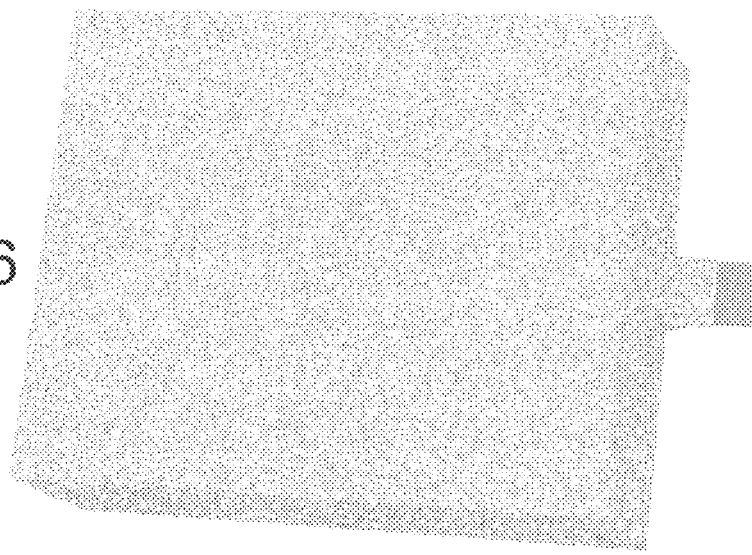

A series of D case 33 µF, 35V tantalum anodes were prepared. A thin coating of conductive polymer (PEDOT)

was applied onto the anodes via an in-situ chemical polymerization process. The anodes were first coated with a conductive polymer dispersion. A conducting polymer dispersion comprising amine compounds was prepared. After drying a conductive polymer dispersion comprising amine compounds was applied over the first conducting polymer dispersion. The conductive polymer dispersion comprising amine compounds was applied 3 more times followed by curing. The cured parts were analyzed by SEM for polymer coverage and a percentage coverage was obtained. Representations of the SEM images are provided in FIGS. 5 and 6. Graphite and Ag coatings were applied and the samples electrical properties were analyzed. The coverage and electrical properties are recorded in Table 1.

TABLE 1

Comparison of bias HAST ESR shift for prior art and inventive

| Examples | Polymer Coverage | ESR (mOhm) |
| --- | --- | --- |
| Comparative Example 1 | 92% | 45.25 |
| Comparative Example 2 | 99% | 43.59 |
| Inventive Example | 99% | 40.32 |

The results presented in Table 1 and FIGS. 1-6 clearly demonstrate the coverage enhancement properties of the inventive conducting polymer as well as improved ESR. The improved ESR is attributed to the presence of a conducting polymer layer instead of prior art insulative crosslinker layer.

Inventive Example 2

A series of D case 33 µF, 35V tantalum anodes would be prepared. A thin coating of conductive polymer (PEDOT) would be applied onto the anodes via an in-situ chemical polymerization process. The anodes would be first coated with a conductive polymer dispersion. A conducting polymer dispersion comprising amine compounds would be prepared. After drying a conductive polymer dispersion comprising amine compounds would be applied over the first conducting polymer dispersion. After drying alternate layers of first dispersion and second dispersion comprising amine compound would be applied and repeated 5 times. Graphite and Ag coatings would be applied and the samples electrical properties would be analyzed.

Inventive Example 3

A series of D case 33 µF, 35V tantalum anodes would be prepared. A thin coating of conductive polymer (PEDOT) would be applied onto the anodes via an in-situ chemical polymerization process. The anodes would be first coated with a conductive polymer dispersion with polyanion to conducting polymer ratio of 3.3. A conducting polymer dispersion with polyanion to conducting polymer ratio of 2.7 comprising amine compounds would be prepared. After drying a conductive polymer dispersion comprising amine compounds would be applied over the first conducting polymer dispersion. After drying alternate layers of first dispersion and second dispersion comprising amine compound would be applied and repeated 5 times followed by curing. Graphite and Ag coatings would be applied and the samples electrical properties would be analyzed.

Inventive Example 4

A series of D case 33 µF, 35V tantalum anodes would be prepared. The anodes would be first coated with a conductive polymer dispersion with polyanion to conducting polymer ratio of 3.3. A conducting polymer dispersion with polyanion to conducting polymer ratio of 2.7 comprising amine compounds would be prepared. After drying a conductive polymer dispersion comprising amine compounds would be applied over the first conducting polymer dispersion. The conductive polymer dispersion comprising amine compounds would be applied 3 more times followed by curing. Graphite and Ag coatings would be applied and the samples electrical properties would analyzed.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A process for forming an electrolytic capacitor comprising:
   providing an anode body with an anode wire extending from said anode body;
   forming a dielectric on said anode body to form an anodized anode;
   applying a first slurry on said dielectric wherein said first slurry comprises conducting polymer and polyanion, wherein said polyanion and conducting polymer are in a first weight ratio thereby forming a first slurry layer; and
   applying a second slurry on said first slurry layer wherein said second slurry comprises a crosslinker, said conducting polymer and said polyanion and wherein said polyanion and said conducting polymer are in a second weight ratio wherein said second weight ratio is lower than said first weight ratio wherein said first weight ratio is no more than 6 and said second weight ratio is no more than 3 wherein said slurry avoids instant agglomerate.

2. The method for forming an electrolytic capacitor of claim 1 wherein said first weight ratio is no more than 4.

3. The method for forming an electrolytic capacitor of claim 2 wherein said first weight ratio is no more than 3.4.

4. The method for forming an electrolytic capacitor of claim 3 wherein said first weight ratio is 3.0 to 3.4.

5. The method for forming an electrolytic capacitor of claim 1 wherein said second weight ratio is no more than 2.

6. The method for forming an electrolytic capacitor of claim 5 wherein said second weight ratio is no more than 1.

7. The method for forming an electrolytic capacitor of claim 1 wherein said second weight ratio is less than said first weight ratio by at least 5%.

8. The method for forming an electrolytic capacitor of claim 7 wherein said second weight ratio is less than said first weight ratio by at least 6%.

9. The method for forming an electrolytic capacitor of claim 8 wherein said second weight ratio is less than said first weight ratio by at least 8%.

10. The method for forming an electrolytic capacitor of claim 1 wherein said first slurry comprises a second crosslinker.

11. The method for forming an electrolytic capacitor of claim 1 wherein said polyanion and said crosslinker are in one molecule.

12. The method for forming an electrolytic capacitor of claim 1 wherein said crosslinker is an amine.

13. The method for forming an electrolytic capacitor of claim 12 wherein said amine is selected from a diamine and a monoamine.

14. The method for forming an electrolytic capacitor of claim 13 wherein said diamine is diaminodecane.

15. The method for forming an electrolytic capacitor of claim 13 wherein said monoamine is tris(hydroxymethyl) aminomethane.

16. The method for forming an electrolytic capacitor of claim 1 wherein said conductive polymer comprises thiophene.

17. The method for forming an electrolytic capacitor of claim 16 wherein said thiophene comprises polyethylenedioxythiophene.

18. The method for forming an electrolytic capacitor of claim 1 wherein said polyanion comprises sulfonic acid.

19. The method for forming an electrolytic capacitor of claim 18 wherein said sulfonic acid is toluene sulfonic acid or polystyrene sulfonic acid.

20. The method for forming an electrolytic capacitor of claim 1 wherein said anode body comprises a valve metal.

21. The method for forming an electrolytic capacitor of claim 20 wherein said valve metal comprises a material selected from the group consisting of Al, W, Ta, Nb, Ti, Zr or Hf.

22. A process for forming an electrolytic capacitor comprising:
   providing an anode body with an anode wire extending from said anode body;
   forming a dielectric on said anode body to form an anodized anode;
   forming a layer of conductive polymer on said dielectric;
   applying a first slurry on said layer of conductive polymer wherein said first slurry comprises conducting polymer and polyanion, wherein said polyanion and conducting polymer are in a first weight ratio thereby forming a first slurry layer; and
   applying a second slurry on said first slurry layer wherein said second slurry comprises a crosslinker, said conducting polymer and said polyanion and wherein said polyanion and said conducting polymer are in a second weight ratio wherein said second weight ratio is lower than said first weight ratio wherein said first weight ratio is no more than 6 and said second weight ratio is no more than 3 wherein said slurry avoids instant agglomeration.

23. The method for forming an electrolytic capacitor of claim 22 wherein said first weight ratio is no more than 4.

24. The method for forming an electrolytic capacitor of claim 23 wherein said first weight ratio is no more than 3.4.

25. The method for forming an electrolytic capacitor of claim 24 wherein said first weight ratio is 3.0 to 3.4.

26. The method for forming an electrolytic capacitor of claim 22 wherein said second weight ratio is no more than 2.

27. The method for forming an electrolytic capacitor of claim 26 wherein said second weight ratio is no more than 1.

28. The method for forming an electrolytic capacitor of claim 22 wherein said second weight ratio is less than said first weight ratio by at least 5%.

29. The method for forming an electrolytic capacitor of claim 28 wherein said second weight ratio is less than said first weight ratio by at least 6%.

30. The method for forming an electrolytic capacitor of claim 29 wherein said second weight ratio is less than said first weight ratio by at least 8%.

31. The method for forming an electrolytic capacitor of claim 22 wherein said forming of said layer of conductive polymer on said dielectric comprises in-situ polymerization.

32. The method for forming an electrolytic capacitor of claim 22 wherein said first slurry comprises a second crosslinker.

33. The method for forming an electrolytic capacitor of claim 22 said polyanion and said crosslinker are in the same molecule.

34. The method for forming an electrolytic capacitor of claim 22 wherein said crosslinker is an amine.

35. The method for forming an electrolytic capacitor of claim 34 wherein said amine is selected from a diamine and a monoamine.

36. The method for forming an electrolytic capacitor of claim 35 wherein said diamine is diaminodecane.

37. The method for forming an electrolytic capacitor of claim 35 wherein said monoamine is tris(hydroxymethyl) aminomethane.

38. The method for forming an electrolytic capacitor of claim 22 wherein said conductive polymer comprises thiophene.

39. The method for forming an electrolytic capacitor of claim 38 wherein said thiophene comprises polyethylenedioxythiophene.

40. The method for forming an electrolytic capacitor of claim 22 wherein said polyanion comprises sulfonic acid.

41. The method for forming an electrolytic capacitor of claim 40 wherein said sulfonic acid is toluene sulfonic acid or polystyrene sulfonic acid.

42. The method for forming an electrolytic capacitor of claim 22 wherein said anode body comprises a valve metal.

43. The method for forming an electrolytic capacitor of claim 42 wherein said valve metal comprises a material selected from the group consisting of Al, W, Ta, Nb, Ti, Zr or Hf.

* * * * *